United States Patent
Ohle

Patent Number: 5,922,970
Date of Patent: Jul. 13, 1999

[54] VORTEX FLOW SENSOR WITH A TURBULENCE GRID

[75] Inventor: Frank Ohle, Steinen, Germany

[73] Assignee: Endress + Hauser Flowtec AG, Reinach, Switzerland

[21] Appl. No.: 08/907,694

[22] Filed: Aug. 8, 1997

Related U.S. Application Data

[60] Provisional application No. 60/024,770, Aug. 28, 1996.

[30] Foreign Application Priority Data

Aug. 21, 1996 [EP] European Pat. Off. ............. 96113384
Jul. 24, 1997 [EP] European Pat. Off. ............. 97810525

[51] Int. Cl.$^6$ .................. G01F 1/32; F15D 55/00
[52] U.S. Cl. ........................... 73/861.22; 138/37
[58] Field of Search ..................... 73/861.22, 861.23, 73/861.24, 198, 118.2; 138/37, 40, 43

[56] References Cited

U.S. PATENT DOCUMENTS

| | | | |
|---|---|---|---|
| 3,572,391 | 3/1971 | Hirsch | 138/40 |
| 3,840,051 | 10/1974 | Akashi et al. | 138/37 |
| 3,856,049 | 12/1974 | Scull | 138/37 |
| 3,965,730 | 6/1976 | Innes . | |
| 4,280,360 | 7/1981 | Kobayashi et al. | 138/37 |
| 4,397,192 | 8/1983 | Mollet | 73/861.22 |
| 5,193,399 | 3/1993 | Kumano et al. | 73/861.22 |

FOREIGN PATENT DOCUMENTS 0 038 258   10/1981   European Pat. Off. .
2 434 374    3/1980   France .

*Primary Examiner*—Harshad Patel
*Attorney, Agent, or Firm*—Bose McKinney & Evans

[57] ABSTRACT

This vortex flow sensor (1) for measuring the flow velocity and/or the volumetric flow rate of a fluid flowing in a measuring tube (2) has an improved measurement accuracy according to the following design: A bluff body (4) is mounted in the measuring tube and designed to generate Kármán vortices; a vortex-sensing element (5) is responsive to vortex-induced pressure fluctuations; and a turbulence grid (6) is mounted upstream of the bluff body and has openings with at least partially differing cross sections. The turbulence grid cn be circular and formed by radial members and spaced-apart concentric circular members. The turbulence grid can have a thickness D in the direction of flow and be located at a distance x from the bluff body, said thickness and said distance satisfying the inequality: 20D<x<40D.

7 Claims, 1 Drawing Sheet

VORTEX FLOW SENSOR WITH A TURBULENCE GRID

This application claims the benefit of U.S. Provisional Appln. Ser. No. 60/024,770 filed Aug. 28, 1996.

FIELD OF THE INVENTION

The present invention relates to a vortex flow sesnsor for measuring the flow velocity and/or the volumetric flow rate of a fluid flowing in a measuring tube, comprising a bluff body mounted in the measuring tube and a turbulence grid mounted upstream of the bluff body.

BACKGROUND OF THE INVENTION

During operation of such a vortex flowmeter, a Kármán vortex street is formed downstream of the bluff body. Its pressure fluctuations are converted by a vortex-sensing element into an electric signal whose frequency is proportional to the volumetric flow rate.

The turbulence grid, which is mounted upstream of the bluff body, generates miniature vortices which contribute to a uniformity of the flow profile. Turbulence grids are not to be confused with flow conditioners, see U.S. Pat. No. 3,965,730, with flow straighteners or flow rectifiers, see U.S. Pat. No. 4,280,360 or U.S. Pat. No. 5,193,399.

Whereas flow straighteners dampen or even suppress turbulences of the flow, i.e. laminarize the flow, turbulence grids generate particularly well-defined turbulences. Flow rectifiers are also used together with turbulence grids upstream or downstream of the latter to increase the measurement accuracy.

U.S. Pat. No. 4,397,192 describes a vortex flow sensor for measuring the flow velocity and/or the volumetric flow rate of a fluid flowing in a measuring tube, comprising:
 a bluff body (therein named "vortex-shedding obstacle") mounted in the measuring tube and designed to generate Kármán vortices;
 a vortex-sensing element responsive to vortex-induced pressure fluctuations; and
 a turbulence grid mounted upstream of the bluff body and having openings with identical, square cross sections.

SUMMARY OF THE INVENTION

As this prior art shows, it has obviously so far been assumed that a sufficient increase in accuracy can be achieved with regular and identical cross sections of the openings of the turbulence grid.

However, the market expects ever increasing accuracies, which are already of the order of ±0.1%. Such accuracies cannot be achieved with the prior art vortex flow sensor.

It is, therefore, an object of the invention to further improve the measurement accuracy.

To accomplish this, the invention provides a vortex flow sensor for measuring the flow velocity and/or the volumetric flow rate of a fluid flowing in a measuring tube, comprising:
 a bluff body mounted in the measuring tube and designed to generate Kármán vortices;
 a vortex-sensing element responsive to vortex-induced pressure fluctuations; and
 a turbulence grid mounted upstream of the bluff body and having openings with at least partially differing cross sections.

In a first preferred embodiment of the invention, the turbulence grid is circular and is formed by radial members and spaced-apart concentric circular members.

According to a development of this embodiment, a number of radial members are evenly distributed and the spacing of the circular members decreases from the outside toward the inside, particularly according to an exponential function.

In a second preferred embodiment of the invention, the turbulence grid is also circular, but it consists of an inner circular grid having square openings with a cross section of a first value and at least one outer, adjoining annular grid having square openings with a cross section of a second value which is greater than the first value.

According to a development of this preferred embodiment, two or more annular grids are provided whose respective square openings have a cross section of a value which decreases from the outside toward the inside but is constant in each annular grid.

In a third preferred embodiment of the invention, the turbulence grid has a thickness D in the direction of flow and is located at a distance x from the bluff body, said thickness and said distance satisfying the inequality 20D<x<40D.

An advantage of the invention is that, if the vortex flow sensor is installed in a pipe, no or only short lengths of entrance are necessary.

BRIEF DESCRIPTION OF THE DRAWINGS

The invention and its advantages will become more apparent from the following description of embodiments taken in conjunction with the accompanying drawings, in which:

FIG. 2b shows a function diagram pertaining to FIG. 2a;

DETAILED DESCRIPTION OF THE DRAWINGS

Figure 1:
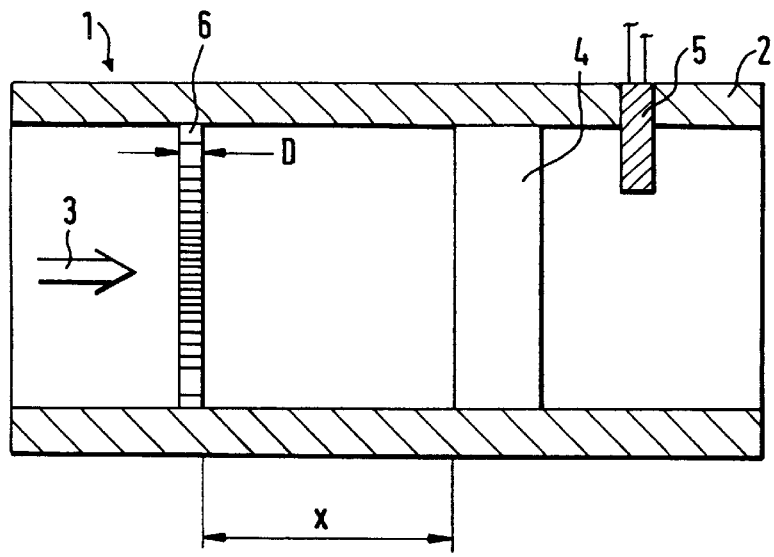
FIG. 1 is a schematic longitudinal section of a vortex flow sensor with a turbulence grid.

Referring to FIG. 1, an embodiment of a vortex flow sensor 1 is shown in a schematic longitudinal section. It comprises a measuring tube 2 through which a fluid to be measured, e.g., a liquid, a gas, or a vapor, particularly water vapor, flows in a predetermined direction, as indicated by the arrow 3.

A bluff body 4 is mounted in the measuring tube 2, e.g., by being welded to the internal wall of the measuring tube. The bluff body 4 serves to generate Kármán vortices and has any of the shapes commonly chosen for this purpose. For example, it may have a triangular or trapezoidal cross section, the fluid flowing against a triangular or trapezoidal surface, particularly perpendicular to the latter.

In the embodiment of FIG. 1, a vortex-sensing element 5 responsive to vortex-induced pressure fluctuations in the fluid is mounted in the wall of the measuring tube 2 downstream of the bluff body 4. For the vortex-sensing element 5, any of the conventional types of electromechanical pressure transducers used in vortex flow sensors can be employed, such as capacitive, piezoelectric, or inductive, particularly electrodynamic, transducers.

Instead of placing the vortex-sensing element 5 downstream of the bluff body 4, it may also be mounted in a bore of the bluff body, in which case the pressure fluctuations reach the vortex-sensing element through at least one further bore in the bluff body. The vortex-sensing element may also be sealingly fitted in a lateral surface of the bluff body, with the electric leads of the vortex sensor passing through a hole in the bluff body which is not connected with the fluid.

Upstream of the bluff body 4, a turbulence grid 6 is mounted in the measuring tube 2. In the embodiment shown, this turbulence grid 6 extends across the entire lumen of the measuring tube 2 and is thus circular. It has openings with at least partially differing cross sections. The turbulence grid 6 has a thickness D in the direction of flow and is located at a distance x from the bluff body 4. Preferably, 20D<x<40D. Between the bluff body 4 and the turbulence grid 6, a homogeneous isotropic turbulence is generated in the fluid by the turbulence grid 6.

Figure 2A:
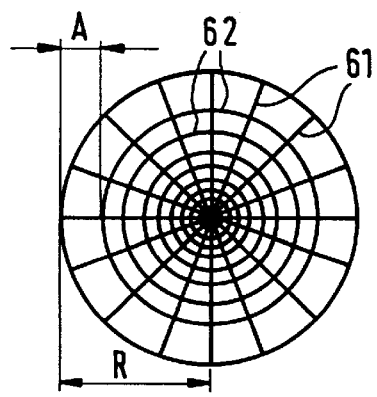
FIG. 2a is a schematic cross section of a first variant of a turbulence grid.

FIG. 2a shows a first variant of the turbulence grid 6 in a front view. This turbulence grid is circular and is formed by radial members 61 of length R and concentric circular members 62 which are separated by distances A. The turbulence grid of FIG. 2a thus has a center from which the radial members 61 diverge. The length R is also the radius of the lumen of the measuring tube 2.

In particular according to FIG. 2a, the radial members 61, the number of which is 16, are evenly distributed across the circumference of the circle. The spacing between the circular members decreases from the outside toward the inside, preferably according to a exponential function, for which holds:

$$A = k_1 + k_2 R + k_3 R^{1.4}$$

Figure 2B:
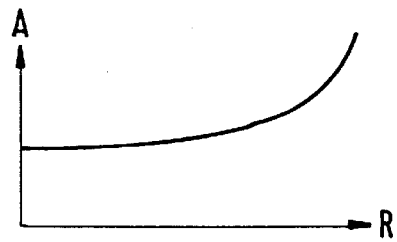

$k_1$, $k_2$, $k_3$ are constants which can be chosen as required by the manufacturer of the vortex flow sensors. $k_1$ is the spacing of the innermost circular area from the centre and corresponds to the crossing point of the curve of FIG. 2b with the ordinate. In FIG. 2b, this exponential function is shown qualitatively as a diagramm, i.e. not to scale.

In FIG. 2a, the individual sectors between two adjacent circular members 62 are equal in area; the value of these areas can be easely calculated using known circular geometry formulas.

The sector areas, which when viewed from the centre to the outside consecutively follow two neigbouring radial members 61, however, do not have the same area but their cross section area reduces step-wise in the direction to the centre. The size of the sector areas can be chosen as required by the manufacturer of the vortex flow sensors.

Figure 3:
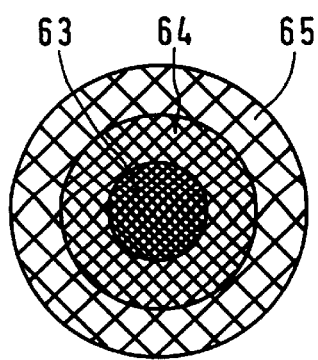
FIG. 3 is a schematic cross section of a second variant of a turbulence grid.

FIG. 3 shows a second variant of the turbulence grid 6 in a front view which, in contrast to the first variant, has square openings. Therefore, their areas do not have any mathematical relationship to the area of the openings of the first variant.

The turbulence grid of FIG. 3 is circular as in FIG. 2a, but it consists of an inner circular grid 63 having openings with a cross section of a first value, a first outer, adjoining annular grid 64 having openings with a cross section of a second value which is greater than the first value, and a second outer, adjoining annular grid 65 having openings with a cross section of a third value which is greater than the second value. These three area values can be chosen as required by the manufacturer of the vortex flow sensors.

In the embodiment of FIG. 3, the squares of the circular grid 63 and those of the annular grids 64, 65 are arranged in the same direction; their edges are thus parallel to each other and partly in alignment. That need not necessarily be so. The squares in the circular grid 63 may also be arranged in a different direction from those in the annular grid 64 or 65.

Figure 4:
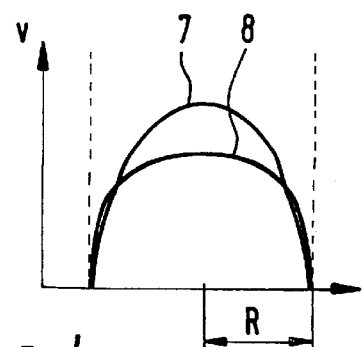
FIG. 4 is a flow-profile diagram.

FIG. 4 shows two qualitative curves of a flow profile as is formed in the measuring tube 2 without (curve 7) and with (curve 8) the turbulence grid 6. The ordinate represents the flow velocity, and the abscissa represents the diameter of the lumen of the measuring tube 2 (see the dashed lines), with the radius R being marked. The flow profile of curve 8 is lower than that of curve 7, and is thus practically constant over a large part of the cross section.

I claim:

1. A vortex flow sensor for measuring at least one of the flow velocity and the volumetric flow rate of a fluid flowing in a measuring tube, comprising:

a bluff body mounted in the measuring tube and designed to generate Kármán vortices;

a vortex-sensing element responsive to vortex-induced pressure fluctuations; and a turbulence grid mounted upstream of the bluff body and having openings with at least partially differing cross sections wherein the openings have cross sections of values which decrease from the perimeter of the turbulence grid to the center of the turbulence grid.

2. A vortex sensor as claimed in claim 1 wherein the turbulence grid is circular and is formed by radial members and spaced-apart concentric circular members.

3. A vortex sensor as claimed in claim 2 wherein a number of radial members are evenly distributed and the spacing of the circular members decreases from the outside toward the inside.

4. A vortex sensor as claimed in claim 3 wherein the spacing of the circular members decreases according to an exponential function.

5. A vortex sensor as claimed in claim 1 wherein the turbulence grid is circular, but it consists of an inner circular grid having square openings with a cross section of a first value and at least one outer, adjoining annular grid having square openings with a cross section of a second value which is greater than the first value.

6. A vortex sensor as claimed in claim 5 wherein two or more annular grids are provided whose respective square openings have a cross section of a value which decreases from the outside toward the inside but is constant in each annular grid.

7. A vortex sensor as claimed in claim 1 wherein the turbulence grid has a thickness D in the direction of flow and is located at a distance x from the bluff body, said thickness and said distance satisfying the inequality: 20D<x<40D.

* * * * *